United States Patent [19]

Bilings

[11] Patent Number: 5,271,355
[45] Date of Patent: Dec. 21, 1993

[54] ABSORBENT MATERIAL WITH WOOD AND PEAT

[76] Inventor: Lanny D. Bilings, R.R. 1, Orchard, Nebr. 68764

[21] Appl. No.: 14,735

[22] Filed: Feb. 8, 1993

[51] Int. Cl.⁵ .............................................. A01K 29/00
[52] U.S. Cl. ........................................................ 119/171
[58] Field of Search ................................ 119/171, 172

[56] References Cited

U.S. PATENT DOCUMENTS

| | | |
|---|---|---|
| 4,788,936 | 12/1988 | Billings ................... 119/171 |
| 5,044,324 | 9/1991 | Morgan et al. ............ 119/171 |

FOREIGN PATENT DOCUMENTS 2298272  8/1976  France ................... 119/171

Primary Examiner—Gene Mancene
Assistant Examiner—Thomas Price
Attorney, Agent, or Firm—John A. Beehner

[57] ABSTRACT

An absorbent material includes a mixture of poplar wood and peat in the volume ratio range 1:0.01 to 1:100, the material being formed to be dispensable for absorbing liquids and other substances. Cedar may also be included in the material. The material is produced by grinding poplar chips into a sawdust-like poplar material, drying the poplar material to remove moisture therefrom and mixing the poplar material with a quantity of peat to form the absorbent material. The resulting material is then pelletized to form pellets of the absorbent material whereby the material may be more easily dispensed.

17 Claims, 1 Drawing Sheet

| PRODUCT CONTENTS | | | |
|---|---|---|---|
| | PRODUCT 1 | PRODUCT 2 | PRODUCT 3 |
| ASPEN | 85% | 67% | 60% |
| PEAT | 15% | 33% | 15% |
| CEDAR | 0% | 0% | 25% |

| PRODUCT CONTENTS | | | |
|---|---|---|---|
| | PRODUCT 1 | PRODUCT 2 | PRODUCT 3 |
| ASPEN | 85% | 67% | 60% |
| PEAT | 15% | 33% | 15% |
| CEDAR | 0% | 0% | 25% |

FIG. 1

ABSORBENT MATERIAL WITH WOOD AND PEAT

BACKGROUND OF THE INVENTION

1. Technical Field

This invention relates to absorbent materials and, more particularly, to an absorbent material including ground and dried poplar wood and peat, the material produced in the form of pellets.

2 Description of the Prior Art

The need for absorption products is vast. Oil companies require absorbent for spills on water and in their pipeline, exploration and production operations. Absorbents are necessary for the transfer of bulk liquids via tank cars or trailers to absorb nuisance spills and accidental leaks. Industrial and chemical plants spread absorbents under machines, along assembly lines and at spill sites for safety and cleanliness. Machine shops and aircraft maintenance and service areas spread absorbents over aisles and under machines for clean, dry floors. While the most visible of these spills and accidents occurs in oil spill disasters such as that involving the Exxon Valdez, it is estimated that every year, Americans throw away or dump used oil equivalent in quantity to 30 Exxon Valdez spills. Besides oil spills, there is a similar need for cleaning spills of all kinds of other chemicals, including gas by-products, industrial chemicals, fertilizers and other liquids.

Further uses of absorbent material include cat litter and animal bedding such as that used for turkeys and other farm animals. The major attribute that an absorbent material must have to be used in these applications is that the material must be odor absorbent, economical and non-toxic.

The present products of the art include various absorbent materials which obtain absorbency through use of a variety of substances, including clay, cellulose, peat, cork and plastics, each of which have various drawbacks. For example, peat and cork are more absorbent than clay and are biodegradable but are very expensive. Clay and chemical-based products are not environmentally sound as they are not biodegradable. In addition, clay-based products containing silica are hazardous to use and store. There is, therefore, a need for an absorbent material which has all of the following characteristics:

(1) Safe for people and the environment,
(2) Easy to use,
(3) Incinerable and/or reusable,
(4) Capable of providing energy,
(5) Economical, and
(6) Is odor absorbent.

Therefore, an object of the present invention is to provide an improved absorbent material.

Another object of the present invention is to provide an absorbent material which is safe and non-toxic for use by people and by animals.

Another object of the present invention is to provide an absorbent material which is biodegradable and thus will not aggravate the problems associated with the use of landfills.

Another object of the present invention is to provide an absorbent material which provides a high liquid absorption to material weight ratio at a lower cost than is presently found in the prior art.

Another object of the present invention is to provide an absorbent material which is provided in pelleted form to simplify use thereof.

Another object of the present invention is to provide an absorbent material which is either reusable to reduce waste or is incinerable, thus providing energy through that incineration.

Another object of the present invention is to provide an absorbent material which also absorbs odors.

Finally, an object of the present invention is to provide an absorbent material which is simple and economical to manufacture and safe and efficient in use.

SUMMARY OF THE INVENTION

The present invention provides an absorbent material consisting of a mixture of poplar wood or bark and peat in the volume ratio range 1:0.01 to 1:100. The material is formed to be dispensable for absorbing liquids and other substances.

The absorbent material may also include a quantity of cedar wood. Addition of cedar wood adds a pleasing aroma to the absorbent material, while also acting to repel insects from the material. The addition of cedar is thus important in such uses as cat litter and animal bedding.

The method of producing the absorbent material of the present invention includes the steps of grinding poplar chips into a sawdust-like poplar material and then drying the poplar material to reduce the moisture level in the material. This poplar material is then mixed with a quantity of peat to form the absorbent material, the resulting mixture being fed into a pelletizing machine to produce pellets of the absorbent material. The absorbent material may thus be more easily dispensed. As was stated above, the mixing step may also include addition of cedar wood which has been treated in a manner similar to that performed on the poplar wood.

The present invention thus provides an absorbent material which is safe and non-toxic for people and animals. It is easy to use and may be incinerated for disposal. Alternatively, the absorbent material may be crushed to release liquids absorbed therein, these liquids then being separated and the absorbent material reconstituted into pellets for reuse. The addition of cedar wood to the product increases the odor absorbency of the material and reduces the tendency of insects to infest the material when used as cat litter or animal bedding. The materials used to form the absorbent material are abundant at low cost, thus reducing the overall price of the absorbent material. The present invention thus provides a substantial improvement over the alternative absorbent materials found in the prior art.

BRIEF DESCRIPTION OF THE DRAWINGS

FIG. 1 is a chart diagram showing the 3 products of the present invention.

DESCRIPTION OF THE PREFERRED EMBODIMENT

The absorbent material of the present invention preferably includes the following elements: poplar wood, peat and, in some embodiments, cedar. It is preferred that the wood used in the present invention be aspen wood, however, it is to be understood that any poplar-type wood is acceptable for use in the present absorbent material. Reference in this description and to appended claims to poplar or cedar "wood" is intended to include all forms of those wood products including bark. It is preferred that the aspen wood be in the form of a dried aspen material produced in the following manner. Aspen chips containing 40 to 50% moisture are first put through a "hog" which grinds the aspen chips into smaller pieces resembling sawdust. This "sawdust" is then fed into a dehydrator which dries the aspen material to a 7% or 8% moisture content as well as sterilizing the aspen material. After drying, the aspen material is blended with varying amounts of peat or peat and cedar in a mixing process. This mixture is then fed to the pelletizing machine which produces pellets having dimensions of 3/16" by 1¼". The production process thus described is substantially similar to the process described in Billings, U.S. Pat. No. 4,788,936, for methods for bedding livestock and treating sludge.

The preferred wood to be used is poplar, aspen preferably because aspen is the only wood that has spores. Other woods run grains which inhibits their absorbency. This natural absorbency of aspen may be further enhanced by the addition of peat into its spores. When the peat and aspen material are mixed together, the peat is contained in the aspen wood spores and thus cannot blow around during the processing of the absorbent material. In addition, it is more economical to pelletize aspen and peat together than aspen alone. Aspen is a hard, dry wood and exacts a toll on extruding equipment by causing greater amounts of wear on the equipment. Aspen and peat together are not as hard as aspen alone and the peat acts as a lubricant to reduce loads on the pelletizing equipment.

Another advantage of combining aspen and peat to form the absorbent material of the present invention is that while peat absorbs oil very well, peat does not absorb other liquids with the same efficiency. Aspen, on the other hand, does absorb those liquids with a good deal of efficiency. Therefore, combining both peat and aspen provides a superior absorbent material which is lower in dust and provides a high degree of all-around absorbency.

As shown in FIG. 1, it is preferred that three variations on the absorbent material be manufactured, each having different percentages of aspen, peat and cedar. Product 1 is shown as having as aspen content of 85% and a peat content of 15% by volume. It is preferred that the aspen material utilized in product 1 be the dried aspen material described above. The peat used in manufacturing product 1 is preferably a hydrophobic peat, which means that the peat will not absorb water. Product 1 is intended to be used as a multi-purpose absorbent for use in such situations as industrial and chemical spills, machine shops, meat and food plants, retail operations and various other consumer uses.

Product 2 is shown as having an aspen material content of 67% by volume and a peat content of 33% by volume, the peat once again being a hydrophobic peat. Product 2 is designed to be used as an oil recovery product used for larger spills, such as that associated with tanker spills or well blowouts. The higher content of hydrophobic peat means that product 2 may be used to clean oil spills on water, as the product soaks up oil, but will not soak up substantial amounts of water. Product 2 may also be used in situations such as aircraft maintenance and the cleaning of traffic accidents.

The product as described above may be used in various ways to absorb oil spills, particularly those on water as involved in tanker spills. For example, the product may be contained in a water soluble bag or sack which may be dropped into an oil slick area. The sack, upon impact with the water, will break open releasing the oil-absorbing product, thus slowing or halting spreading of the oil slick. Alternatively, a bag may be provided which will not break open upon contact with water but instead will dissolve, thus releasing the absorbent material from beneath the oil spill. The absorbent material thus may act as a lining on the underside of a spill to significantly lessen damage caused by the spill. The absorbent material may also be used to help prevent oil spills by blowing the absorbent material of the present invention into the cell-type sidewall of an oil tanker to absorb oil leaking therefrom. As most tankers are presently double-hulled, absorbent material may be placed between the hulls to absorb oil leaking from the inner containment chambers and thus preventing leaking oil from contacting the outer hull. In this manner, the severity of spills may be substantially reduced.

Product 3 is shown as having an aspen content of approximately 60% by volume, a peat content of approximately 15% by volume and a cedar content of approximately 25% by volume. It is preferred that the peat used in product 3 be as non-hydrophobic a peat as is available, which will thus absorb water when the peat is in contact therewith. The cedar is added to produce a pleasing smell without sacrificing a great deal of absorbability. Uses for product 3 include use as cat litter, pet bedding and litter, animal bedding product and poultry bedding and nesting material. The use of cedar wood in product 3 further allows the product to take advantage of the insect-repelling characteristics of cedar wood. For example, when product 3 is used in bedding for poultry, certain insects which live in poultry manure are repelled by the cedar wood in the bedding, which could help reduce the number of deaths of poultry bedded therein. Product 3, for use as bedding for animals and livestock, thus provides a substantial improvement over bedding found in the prior art.

The absorbent material of the present invention may also be produced in granular form by feeding the pellets produced by the pelletizing machine into a granulating machine. Following granulation, the product then falls down to a "shaking" screen which makes the granules uniform in size and provides a superior looking product. Following "shaking", the granules are cooled, thus further reducing moisture by approximately 1 to 2%. The moisture content of the final product is, therefore, in the range of 4% to 8%. Finally, the granules are passed over a sieve to remove dust and small particles, collectively known as fines. These fines are then recycled into the next batch of material being produced to cut down on wasted material.

The addition of peat to the product has two beneficial results. The peat lowers the dust produced from the processing operation and makes pelletizing the product easier. Before peat is added to the product in the mixing step, the peat is preferably windrowed and dried, thus resulting in a substantially indefinite shelf life. In this manner, then, the production of absorbent material as described herein may be economized and simplified.

The absorbent material of the present invention provides an improvement over other absorbent materials found in the prior art as disposal or reuse of the material is greatly simplified. Following absorption of liquids, the absorbent material may be either burned or placed in a landfill or other such disposable site without fear of environmental damage. The absorbent material described herein is biodegradable and when incinerated produces no toxic substances. Alternatively, any absorbed substance can be extracted by squeezing the absorbent material, thus releasing the substance contained therein. Following such squeezing, the absorbent material may be re-used. The absorbent material thus presents a substantial improvement over substances such as clay-based absorbent materials or plastics which are not biodegradable and if incinerated may cause toxic substances to be released.

The absorbent material of the present invention, when further compared with other absorbent materials, can be produced for a very low price while still providing absorbency comparable with any other absorbent material presently found. This will result in considerable savings for consumers and considerable commercial success.

There has thus been set forth and described an invention which accomplishes at least all of the stated objectives.

I claim:

1. An absorbent material comprising a mixture of poplar wood and peat in the volume ratio range 1:0.01 to 1:100, said material formed to be dispensable for absorbing liquids and other substances.

2. The absorbent material of claim 1 wherein said poplar wood comprises aspen chips which have been dried to remove a substantial amount of moisture therefrom.

3. The absorbent material of claim 2 wherein said aspen chips contain from 5 to 20 percent moisture after drying.

4. The absorbent material of claim 2 wherein said aspen chips are ground into sawdust-like material before drying to improve drying of said aspen.

5. The absorbent material of claim 1 wherein said material further comprises cedar wood in the volume ratio of 1:0.01 to 1:100 to poplar wood such that poplar, cedar and peat may be mixed to form said absorbent material.

6. The absorbent material of claim 5 wherein said volume ratio of cedar to poplar is between 1:0.25 to 1:4.

7. The absorbent material of claim 5 wherein said peat is a hydrophobic peat which will absorb substantially no water when said material is placed in contact therewith.

8. The absorbent material of claim 7 wherein said peat is a hydrophobic peat comprising more than 33% of said material by volume, said poplar wood comprises 10-67% of said material by volume and said cedar wood comprises 0-67% of said material by volume whereby said material may be used for absorbing oil or other such liquids.

9. The absorbent material of claim 5 wherein said peat is a nonhydrophobic peat which will absorb water upon placement of said material in contact with water.

10. The absorbent material of claim 9 wherein said peat is a nonhydrophobic peat comprising 1-20% of said material by volume, said poplar wood comprises 40-50% of said material by volume and said cedar wood comprises 15-50% of said material by volume whereby said material may be used for bedding material for animals.

11. The absorbent material of claim 5 wherein said material is formed into granules or pellets whereby said material may be more easily dispensed.

12. The absorbent material of claim 1 wherein said material is formed into granules or pellets whereby said material may be more easily dispensed.

13. An absorbent material comprising a mixture of dried poplar wood and peat, said poplar wood and said peat mixed in the volume ratio range 1:0.01 to 1:100, said material formed as pellets or granules whereby said material may be more easily and efficiently dispensed for absorbing liquids and other such substances.

14. The absorbent material of claim 13 wherein said material further comprises dried cedar wood in sawdust-like form, said poplar wood and said cedar wood mixed in the volume ratio range 1:0.01 to 1:100 such that said poplar wood, said peat and said cedar wood are mixed to form said absorbent material.

15. A method of producing an absorbent material comprising the steps;
grinding aspen chips into a sawdust-like aspen material;
drying said aspen material to remove moisture therefrom;
mixing said aspen material with a quantity of peat to form said absorbent material; and
pelletizing said absorbent material to form pellets of said absorbent material whereby said material may be more easily dispensed.

16. The method of claim 15 wherein said mixing step further comprises mixing ground and dried cedar wood with said aspen material and said peat, thus forming said absorbent material.

17. The method of claim 15 further comprising the step of granulating said pellets of said absorbent material whereby said material may more efficiently absorb liquids.

* * * * *